United States Patent
Engel et al.

(10) Patent No.: US 10,689,991 B2
(45) Date of Patent: Jun. 23, 2020

(54) TURBINE WHEEL WITH CLAMPED BLADE ATTACHMENT

(71) Applicants: Rolls-Royce North American Technologies Inc., Indianapolis, IN (US); Rolls-Royce Corporation, Indianapolis, IN (US)

(72) Inventors: Todd Z. Engel, Long Beach, CA (US); Ted J. Freeman, Danille, IN (US); Robert J. Shinavski, Mission Viejo, CA (US); Ian Thomson, Whitestown, IN (US)

(73) Assignees: Rolls-Royce North American Technologies Inc., Indianapolis, IN (US); Rolls-Royce Corporation, Indianapolis, IN (US)

( * ) Notice: Subject to any disclaimer, the term of this patent is extended or adjusted under 35 U.S.C. 154(b) by 143 days.

(21) Appl. No.: 16/049,142

(22) Filed: Jul. 30, 2018

(65) Prior Publication Data

US 2018/0355736 A1 Dec. 13, 2018

Related U.S. Application Data

(63) Continuation of application No. 14/974,545, filed on Dec. 18, 2015, now Pat. No. 10,060,277.

(60) Provisional application No. 62/102,758, filed on Jan. 13, 2015, provisional application No. 62/199,657, filed on Jul. 31, 2015.

(51) Int. Cl.
*F01D 5/30* (2006.01)
*F01D 5/28* (2006.01)

(52) U.S. Cl.
CPC .......... *F01D 5/3084* (2013.01); *F01D 5/284* (2013.01); *F01D 5/3007* (2013.01); *F01D 5/3053* (2013.01); *F05D 2220/32* (2013.01); *F05D 2230/10* (2013.01); *F05D 2230/236* (2013.01); *F05D 2230/237* (2013.01); *F05D 2230/60* (2013.01); *F05D 2250/21* (2013.01); *F05D 2260/30* (2013.01); *Y02T 50/672* (2013.01); *Y02T 50/673* (2013.01)

(58) Field of Classification Search
CPC ........ F01D 5/3007; F01D 5/02; F01D 5/3084; F01D 5/303; F01D 5/3083; F01D 5/30; F01D 5/284
USPC ....................................................... 416/248
See application file for complete search history.

(56) References Cited

U.S. PATENT DOCUMENTS

| 875,647 A | 12/1907 | Bassett |
| 2,317,338 A | 4/1943 | Rydmark |

(Continued)

FOREIGN PATENT DOCUMENTS

FR 2608674 A1 6/1988

OTHER PUBLICATIONS

Extended European Search Report, European Application No. 15200603.7-1610, dated Jul. 19, 2016, 7 pages.

*Primary Examiner* — Michael Lebentritt
*Assistant Examiner* — Topaz L. Elliott
(74) *Attorney, Agent, or Firm* — Barnes & Thornburg LLP

(57) ABSTRACT

A turbine wheel for use in a gas turbine engine having a plurality of blades attached to a rotor disk. Each blade is formed from a composite comprising ceramic matrix material. The blades each include a root that fits within dovetail slots of the rotor disk and cooperates with a blade retention assembly to couple the blades to the rotor disk.

18 Claims, 5 Drawing Sheets

(56) References Cited

U.S. PATENT DOCUMENTS

| | | | |
|---|---|---|---|
| 2,819,869 A * | 1/1958 | Meyer, Jr. | F01D 5/3069 |
| | | | 416/131 |
| 2,821,357 A | 1/1958 | Schomer | |
| 4,650,399 A * | 3/1987 | Craig | F01D 5/187 |
| | | | 416/97 R |
| 4,802,824 A * | 2/1989 | Gastebois | F01D 5/282 |
| | | | 416/193 A |
| 5,368,444 A | 11/1994 | Anderson | |
| 5,405,245 A | 4/1995 | Cornelius | |
| 6,132,175 A | 10/2000 | Cai et al. | |
| 6,250,883 B1 | 6/2001 | Robinson et al. | |
| 6,619,924 B2 * | 9/2003 | Miller | F01D 5/005 |
| | | | 29/889.21 |
| 7,104,759 B2 * | 9/2006 | Tipton | F01D 5/3007 |
| | | | 416/204 A |
| 7,204,677 B2 * | 4/2007 | Mannava | C21D 10/005 |
| | | | 416/241 R |
| 7,972,113 B1 * | 7/2011 | Davies | F01D 5/025 |
| | | | 416/214 A |
| 8,231,354 B2 | 7/2012 | Campbell et al. | |
| 8,727,730 B2 | 5/2014 | Liotta et al. | |
| 8,821,127 B1 * | 9/2014 | Knecht | F01D 5/021 |
| | | | 29/889.2 |
| 2010/0135812 A1 | 6/2010 | Cairo et al. | |
| 2011/0142639 A1 | 6/2011 | Campbell et al. | |
| 2011/0142684 A1 | 6/2011 | Campbell et al. | |
| 2011/0243746 A1 | 10/2011 | Liotta et al. | |
| 2012/0308391 A1 | 12/2012 | Garin et al. | |
| 2013/0064668 A1 | 3/2013 | Paige, II et al. | |
| 2013/0243601 A1 | 9/2013 | Floyd | |
| 2013/0247586 A1 | 9/2013 | Luczak | |
| 2013/0323073 A1 | 12/2013 | McCaffrey et al. | |
| 2014/0127026 A1 | 5/2014 | Farineau et al. | |

* cited by examiner

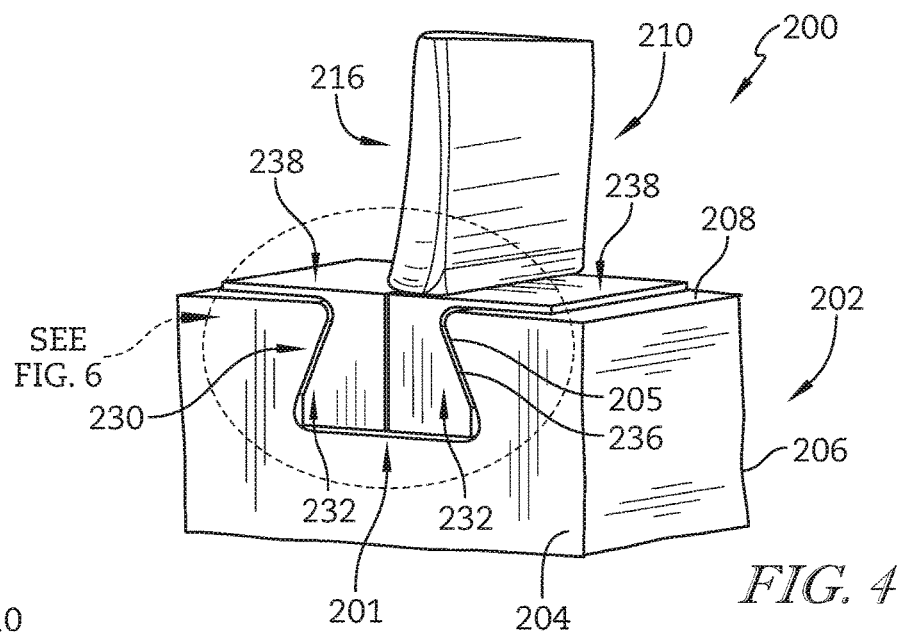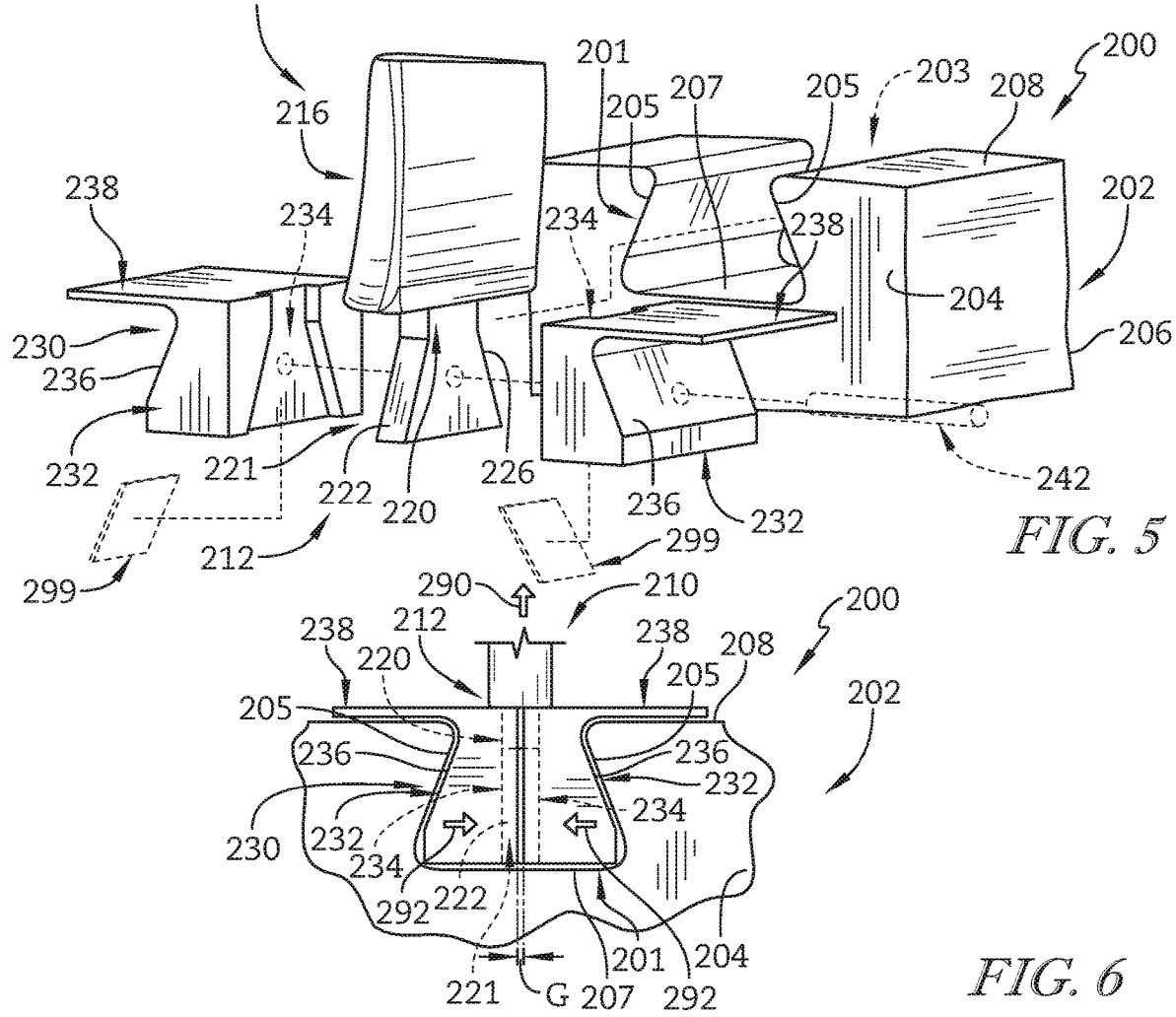

TURBINE WHEEL WITH CLAMPED BLADE ATTACHMENT

CROSS REFERENCE TO RELATED APPLICATIONS

This application is a continuation of U.S. patent application Ser. No. 14/974,545, filed 18 Dec. 2015, which in turn claims priority to and the benefit of U.S. Provisional Patent Application No. 62/102,758, filed 13 Jan. 2015, and U.S. Provisional Patent Application No. 62/199,657, filed 31 Jul. 2015, the disclosures of which are all now expressly incorporated herein by reference.

FIELD OF THE DISCLOSURE

The present disclosure relates generally to gas turbine engines, and more specifically to composite blade attachment.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

To withstand heat from the combustion products received from the combustor, the turbine may include blades made from ceramic-matrix composite materials that are able to interact with the hot combustion products. In some turbine wheels, the blades may be coupled to a metallic disk that supports the blades in a gas path leading out of the combustor. Coupling of the blades made from ceramic-matrix composite materials with metallic disks can present design challenges.

SUMMARY

The present disclosure may comprise one or more of the following features and combinations thereof.

According to the present disclosure, a turbine wheel for a gas turbine engine may include a disk and a blade. The disk may be formed to include a dovetail slot that extends through the disk in an axial direction from a forward side to an aft side of the disk. The dovetail slot may also extend inwardly in a radial direction from an outer diameter of the disk toward a central axis. The blade may comprise ceramic-containing materials. The blade may be formed to include an airfoil that extends outwardly in the radial direction from the outer diameter of the disk and a root that extends into the dovetail slot. The root may include a stem that extends from the airfoil into the dovetail slot and at least one engagement surface extending from the stem.

In illustrative embodiments, the turbine wheel may further include a blade retention assembly. The blade retention assembly may include at least two clamp blocks positioned to receive portions of the root of the blade and to be received in the dovetail slot of the disk so that centrifugal forces applied to the blade when the turbine wheel is rotated about the central axis are transferred from the at least one engagement surface through the blade retention assembly to the disk.

In illustrative embodiments, the clamp blocks may be formed to include recesses. Each of the recesses may be positioned to receive at least a portion of the root of the blade.

In illustrative embodiments, the at least one engagement surface may include a first engagement surface and a second engagement surface positioned opposite of the first engagement surface. Each of the recesses may be formed to match a profile created by the first and second engagement surfaces and positioned to engage the first and second engagement surfaces.

In illustrative embodiments, one of the recesses of one of the clamp blocks may be formed to match a profile created by the first engagement surface and may be positioned to engage the first engagement surface. The other recess of the other clamp block may be formed to match a profile created by the second engagement surface and may be positioned to engage the second engagement surface.

In illustrative embodiments, the turbine wheel may further include a pin. The pin may be positioned to extend through the clamp blocks and the root.

In illustrative embodiments, the blade may further include a platform. The platform may be positioned between the airfoil and the root.

In illustrative embodiments, each clamp block may further include a platform portion. The platform portion may be positioned to extend circumferentially away from the blade.

In illustrative embodiments, the recesses of the clamp blocks may be formed at an angle relative to the dovetail slot. The dovetail slot may be formed at a broach angle relative to the central axis. Clamp blocks may be arranged to position the airfoil of the blade at a greater relative angle to the central axis than the broach angle.

According to another aspect of the present disclosure, a turbine wheel for a gas turbine engine may include a disk and a blade. The disk may be formed to include a dovetail slot that extends through the disk in an axial direction from a forward side to an aft side of the disk and inwardly in a radial direction from an outer diameter of the disk toward a central axis. The blade may comprise ceramic-containing materials and may be formed to include an airfoil that extends outwardly in the radial direction from the outer diameter of the disk and a root that extends into the dovetail slot. The root may include a stem that extends from the airfoil into the dovetail slot and a retention head arranged in the dovetail slot that extends from the stem.

In illustrative embodiments, the turbine wheel may also include a blade retention assembly. The blade retention assembly may include at least two clamp blocks that engage the retention head of the root and that are received in the dovetail slot of the disk so that centrifugal forces applied to the blade when the turbine wheel is rotated about the central axis are transferred from the retention head through the blade retention assembly to the disk.

In illustrative embodiments, the retention head may extend axially out from the stem. In some embodiments, the retention head may extends circumferentially out from the stem.

In illustrative embodiments, the dovetail slots may include a pair of converging angled surfaces and a rounded inner surface connecting the angled surfaces. The angled surfaces may extend radially outward from the rounded inner surface and toward one another.

In illustrative embodiments, each of the clamp blocks may include a cam surface. The cam surfaces may be positioned to engage with one of the angled surfaces during rotation of the rotor disk about the central axis.

In illustrative embodiments, the clamp blocks may be formed to include recesses. Each of the recesses may be positioned to receive at least a portion of the retention head and to form a gap between the clamp blocks when the blade retention assembly and root are received in the dovetail slot.

In illustrative embodiments, the blade may further include a platform positioned between the airfoil and the root. Each clamp block may further include a platform portion positioned to extend circumferentially away from the blade.

According to another aspect of the present disclosure, a method of making a turbine wheel may include positioning a first clamp block to surround and engage at least a portion of a root of a composite blade and positioning a second clamp block to surround and engage at least a different portion of the root than the first clamp block such that a gap is positioned between the first and second clamp blocks. The first and second clamp blocks may form a blade retention assembly.

In illustrative embodiments, the method may include positioning the blade retention assembly in a dovetail slot of a rotor disk. The blade retention assembly may be positioned to engage the dovetail slot formed by the rotor disk to force the first clamp block toward the second clamp block to retain the blade in place relative to the rotor disk during rotation of the rotor disk.

In illustrative embodiments, the method may include positioning a pin through the root of the blade. The pin may also be positioned through the first and second clamp blocks.

These and other features of the present disclosure will become more apparent from the following description of the illustrative embodiments.

BRIEF DESCRIPTION OF THE DRAWINGS

FIG. 4 is a partial perspective view of another turbine wheel adapted for use in a gas turbine engine showing that the turbine wheel includes a blade, a rotor disk having a dovetail slot, and a clamp including a pair of clamp blocks arranged within the dovetail slot to engage a root of the blade and retain the blade to the rotor disk;

FIG. 5 is an exploded assembly view of the turbine wheel of FIG. 1 showing that the blade includes an airfoil and the root and the clamp blocks include recesses for receiving portions of the root to attach the blade to rotor disk, tabs for forming a platform between the airfoil and root of the blade, and cam surfaces for engaging the dovetail slot as shown in FIG. 6;

FIG. 6 is a partial front elevation view of the turbine wheel of FIG. 4 suggesting that as the blade is pulled radially outward by centrifugal forces during operation of the gas turbine engine the cam surfaces of the clamp blocks engage with converging angled surfaces of the dovetail slot to force the clamp blocks toward one another and grip the root of the blade;

DETAILED DESCRIPTION OF THE DRAWINGS

Figure 1:
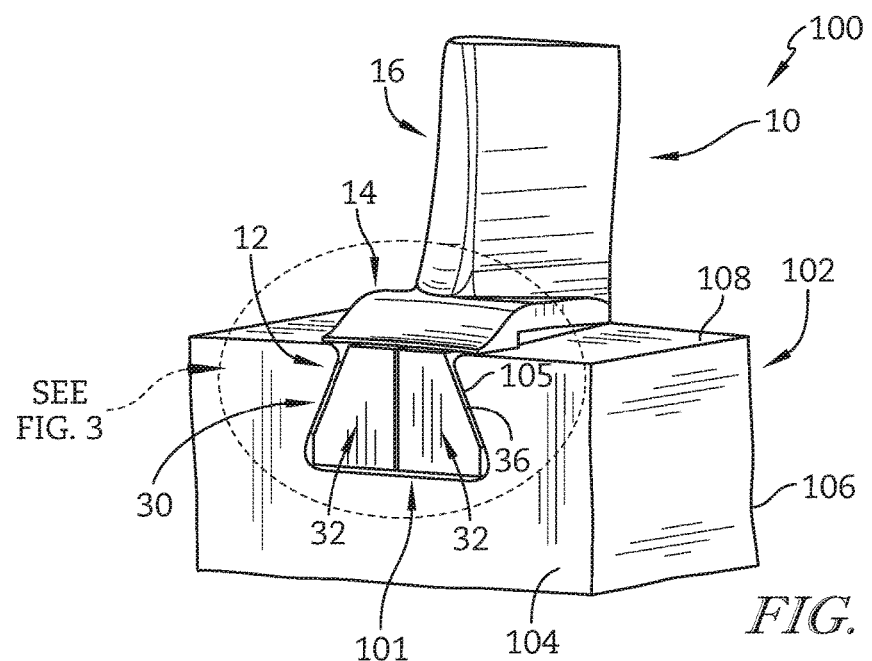
FIG. 1 is a partial perspective view of a turbine wheel adapted for use in a gas turbine engine showing that the turbine wheel includes a blade, a rotor disk having a dovetail slot, and a clamp including a pair of clamp blocks arranged within the dovetail slot to engage a root of the blade and retain the blade to the rotor disk.

For the purposes of promoting an understanding of the principles of the disclosure, reference will now be made to a number of illustrative embodiments illustrated in the drawings and specific language will be used to describe the same.

Figure 2:
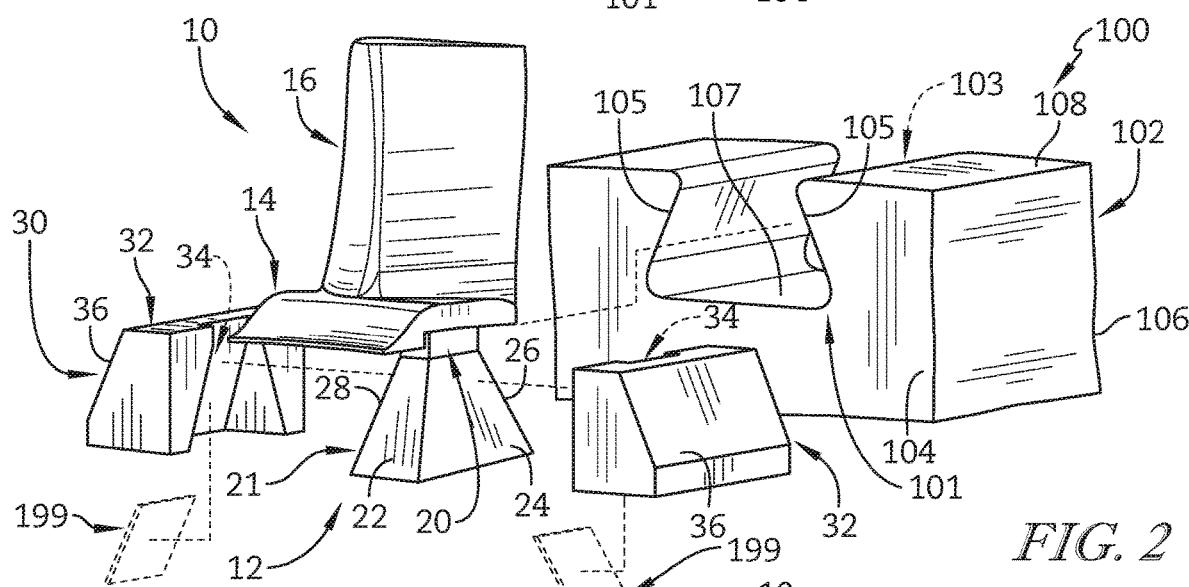
FIG. 2 is an exploded assembly view of the turbine wheel of FIG. 1 showing that the blade includes an airfoil, a platform, and the root having engagement surfaces extending outward in four directions and that the clamp blocks include recesses for receiving portions of the root to attach the blade to rotor disk and cam surfaces for engaging the dovetail slot as shown in FIG. 3.
Figure 3:
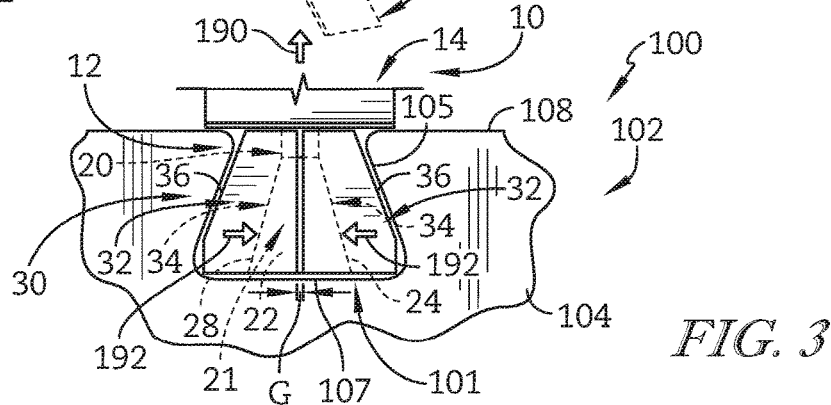
FIG. 3 is a partial front elevation view of the turbine wheel of FIG. 1 suggesting that as the blade is pulled radially outward by centrifugal forces during operation of the gas turbine engine the cam surfaces of the clamp blocks engage with converging angled surfaces of the dovetail slot to force the clamp blocks toward one another and grip the root of the blade.

An illustrative turbine wheel 100 adapted for use in a gas turbine engine is shown in FIGS. 1-3. The turbine wheel 100 includes a rotor disk 102 (only a portion of which is shown), a plurality of turbine blades 10 (only one of which is shown), and a plurality of blade retention assemblies 30 (only one of which is shown) for holding the blades 10 to the rotor disk 102. In accordance with the present disclosure, the turbine blades 10 are attached to the rotor disk 102 for rotation with the rotor disk 102 about a central axis of the gas turbine engine. The blade retention assemblies 30 capture a portion of each blade 10 to engage the rotor disk 102 to couple the blades 10 to the rotor disk 102.

The rotor disk 102 is illustratively made from a metallic superalloy (e.g. Inconel, Waspalloy, etc.) and includes a forward side 104 facing toward a front of the gas turbine engine, an aft side 106 facing toward a rear of the engine, and a radial surface 108 defining an outer diameter of the rotor disk 102 as shown in FIGS. 1 and 2. The rotor disk 102 is additionally formed to include a plurality of dovetail slots 101 (only one of which is shown) formed in the rotor disk 102. In other embodiments, the rotor disk may be made from other metallic or non-metallic materials.

Each dovetail slot 101 extends inwardly in the radial direction from the radial surface 108 of the rotor disk 102 as shown in FIG. 2. Further, each dovetail slot 101 extends through the rotor disk 102 from the forward side 104 to the aft side 106 and is shaped to form a dovetail shape when viewed from the front or aft sides 104, 106. The dovetail slots 101 are positioned to couple the plurality of blades 10 to the rotor disk 102 to form the turbine wheel 100.

The dovetail slot 101 of the rotor disk 102 illustratively includes a pair of converging angled surfaces 105 forming a radially-facing opening 103 and a rounded inner surface 107 connecting the angled surfaces 105 as shown in FIG. 2. The angled surfaces 105 extend radially outward from the rounded inner surface 107 and toward one another. The angled surfaces 105 are positioned to engage the blade retention assembly 30 to retain the root 12 of the blade 10 within the slot 101 as suggested in FIG. 1. The rounded inner surface 107 is sized and shaped to surround the blade retention assembly 30. The rounded inner surface 107 may substantially match the outer profile of the blade retention assembly 30 in order to assist in retaining the root 12 within the slot 101.

Each blade 10 of the exemplary embodiment is made from a ceramic-matrix composite material adapted to withstand high temperature combustion products discharged onto the blade 10. The blades 10 illustratively comprise silicon-carbide reinforcements suspended in silicon-carbide matrix material. In other embodiments, other reinforcements and other ceramic-containing matrix materials may be included in the blades 10.

Each blade 10 is formed to include a root 12, a platform 14 coupled to the root 12, and an airfoil 16 coupled to the platform 14 as shown, for example, in FIG. 2. The platform 14 connects the root 12 to the airfoil 16 and separates the root 12 from the airfoil 16 so that gasses passing over the airfoil 16 are blocked from moving down around the root 12 as suggested in FIG. 1. The airfoil 16 is aerodynamically shaped to interact with gasses moving over the blade 10.

In the illustrative embodiment, the root 12 includes a stem 20 and a retention head 21 as shown in FIG. 2. The stem 20 extends from the airfoil 16 and the platform 14. The retention head 21 forms engagement surfaces 22, 24, 26, 28 extending axially and circumferentially out from the stem 20 as shown in FIG. 2. The stem 20 is sized to be received in a radially-facing opening 103 of the dovetail slot 101 such that the root 12 can pass into the dovetail slot 101 from radially outside the slot 101 as shown in FIG. 1. The retention head 21 sized to be received in the dovetail slot 101 and to be engaged by the retention assembly 30 when the blade 10 is coupled to the disk 102.

The blade retention assembly 30 includes a pair of clamp blocks 32 as shown in FIG. 2. Each clamp block 32 includes a recess 34 for receiving the retention head 21 included in the root 12 of the blade 10 and a cam surface 36 for engaging the angled surfaces 105 of the dovetail slot 101. The recesses 34 substantially match the profile of the retention head 21 of the root 12 being received. For example, the recess 34 of one clamp block 32 is adapted to receive and match the profile created by the engagement surfaces 22, 26, 28, while the recess 34 of the other clamp block 32 is adapted to receive and match the profile created by the engagement surfaces 22, 24, 26.

In some embodiments, the platform 14 and may be incorporated into the clamp blocks 32 of the blade retention assembly 30 with portions of the platform 14 extending from each clamp block 32 as is suggested in FIGS. 4-6. In such embodiments, the platform 14 may be omitted from the blade 10.

The blade retention assembly 30 may be made from a metallic material and may comprise an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, and/or yttrium. In some embodiments the blade retention assembly 30 may comprise a ceramic or composite material in place of a metal or metal alloy.

In the illustrative embodiment, blade retention assembly 30 surrounds the root 12, and the root 12 passes with the blade retention assembly 30 into the dovetail slot 101 of the rotor disk 102 through either the forward or aft end of the dovetail slot 101 as suggested in FIG. 2. Cover plates may be coupled to the rotor disk 102 on the forward and aft sides of the dovetail slot 101 to assist in retaining the blade within the dovetail slot 101. The cover plates may be attached by various methods including, but not limited to, welding or brazing, adhesives, or mechanical fasteners to name a few.

The blade 10 experiences centrifugal forces during operation of the gas turbine engine as suggested by arrow 190 in FIG. 3. The forces 190 pull the blade 10 radially outward and forces the engagement surfaces 22, 24, 26, 28 to engage with the recesses 34 of the clamp blocks 32 which forces the cam surfaces 36 against the angled surfaces 105 of the dovetail slot 101. The cam surfaces 36 of the clamp blocks 32 ride along the angled surfaces 105 of the dovetail slot 101 toward one another forcing the clamp blocks 32 to grip the root 12 as suggested by arrows 192. The recesses 34 of the clamp blocks 32 may be formed such that a gap G is positioned between the clamp blocks 32 when the blade retention assembly 30 is received in the dovetail slot 101 allowing the gripping force 192 to be fully applied to the root 12.

In some embodiments, the wheel 100 may also include optional compliant members 199 as shown in FIG. 2. The compliant members 199 have greater compliance than the clamp blocks 32 and the root of the blade 10. The compliant members 199 are arranged between the clamp blocks 32 and the root 12 of the blade 10 to distribute clamp force applied to the root 12 of the blade 10 by the clamp blocks 32.

In some embodiments, the cam blocks 32 may be fixed to one another rather than free to move relative to one another to trap the root 12 of the blade 10 received by the clamp blocks 32. In some such embodiments, the clamp blocks 32 are diffusion bonded to one another. In other embodiments, the clamp blocks 32 may be diffusion brazed to one another using a braze alloy (illustratively nickel based) with adequate melting point suppressants to effectively diffuse away from a bond interface between the clamp blocks 32 and thereby create little (or no) chemical or microstructural variation between the joint and base materials. In some embodiments, the clamp blocks 32 may be fixed to one another in positions to exert clamp force on the root 12 of the blade 10 received by the clamp blocks 32 when the turbine wheel 100 is stationary.

Another illustrative turbine wheel 200 adapted for use in the gas turbine engine is shown in FIGS. 4-6. The turbine wheel 200 includes a rotor disk 202 (only a portion of which is shown), a plurality of turbine blades 210 (only one of which is shown), and a plurality of blade retention assemblies 230 (only one of which is shown) for holding the blades 210 to the rotor disk 202. In accordance with the present disclosure, the turbine blades 210 are attached to the rotor disk 202 for rotation with the rotor disk 202 about a central axis of the gas turbine engine. The blade retention assemblies 230 capture a portion of each blade 210 to engage the rotor disk 202 to couple the blades 210 to the rotor disk 202.

The rotor disk 202 is illustratively made from a metallic superalloy (e.g. Inconel, Waspalloy, etc.) and includes a forward side 204 facing toward a front of the gas turbine engine, an aft side 206 facing toward a rear of the engine, and a radial surface 208 defining an outer diameter of the rotor disk 202 as shown in FIGS. 4 and 5. The rotor disk 202 is additionally formed to include a plurality of dovetail slots 201 (only one of which is shown) formed in the rotor disk 202. In other embodiments, the rotor disk may be made from other metallic or non-metallic materials.

Each dovetail slot 201 extends inwardly in the radial direction from the radial surface 208 of the rotor disk 202 as shown in FIG. 5. Further, each dovetail slot 201 extends through the rotor disk 202 from the forward side 204 to the aft side 206 and is shaped to form a dovetail shape when viewed from the front or aft sides 204, 206. The dovetail slots 201 are positioned to couple the plurality of blades 210 to the rotor disk 202 to form the turbine wheel 200.

The dovetail slot 201 of the rotor disk 202 illustratively includes a pair of converging angled surfaces 205 forming a radially-facing opening 203 and a rounded inner surface 207 connecting the angled surfaces 205 as shown in FIG. 5. The angled surfaces 205 extend radially outward from the rounded inner surface 207 and toward one another. The angled surfaces 205 are positioned to engage the blade retention assembly 230 to retain the root 212 of the blade 210 within the slot 201 as suggested in FIG. 4. The rounded inner surface 207 is sized and shaped to surround the blade retention assembly 230. The rounded inner surface 207 may substantially match the outer profile of the blade retention assembly 230 in order to assist in retaining the root 212 within the slot 201.

Each blade 210 of the exemplary embodiment is made from a ceramic-matrix composite material adapted to withstand high temperature combustion products discharged onto the blade 210. The blades 210 illustratively comprise silicon-carbide reinforcements suspended in silicon-carbide matrix material. In other embodiments, other reinforcements and other ceramic-containing matrix materials may be included in the blades 210.

Each blade 210 is formed to include a root 212 and an airfoil 216 coupled to the root 212 as shown, for example, in FIG. 5. The airfoil 216 is aerodynamically shaped to interact with gasses moving over the blade 210. In the illustrative embodiment, the root 212 includes a stem 220 and a retention head 221. The stem 20 extends from the airfoil 216. The retention head 221 forms engagement surfaces 222, 226 extending axially out from the stem 220. The stem 220 is sized to be received in a radially-facing opening 203 of the dovetail slot 201 such that the root 212 can pass into the dovetail slot 201 from radially outside the slot 201 as shown in FIG. 4. The retention head is sized to be received in the dovetail slot 201 and to be engaged by the retention assembly 230 when the blade is coupled to the disk 202.

The blade retention assembly 230 includes a pair of clamp blocks 232 as shown in FIG. 5. Each clamp block 232 includes a recess 234 for receiving the retention head 221 included in the root 212 of the blade 210, a cam surface 236 for engaging the angled surfaces 205 of the dovetail slot 201, and a platform portion 238. The platform portions 238 combine to form a platform which separates the root 212 from the airfoil 216 so that gasses passing over the airfoil 216 are blocked from moving down around the root 212 as suggested in FIG. 5. The recesses 234 substantially match the profile of the retention head 221 of the root 212 being received. An optional pin 242 may be positioned through the clamp blocks 232 and root 212 to assist in retaining the blade 210 to the rotor disk 202.

The blade retention assembly 230 may be made from a metallic material and may comprise an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, and/or yttrium. In some embodiments the blade retention assembly 230 may comprise a ceramic or composite material in place of a metal or metal alloy.

In the illustrative embodiment, blade retention assembly 230 surrounds the root 212, and the root 212 passes with the blade retention assembly 230 into the dovetail slot 201 of the rotor disk 202 through either the forward or aft end of the dovetail slot 201 as suggested in FIG. 5. Cover plates may be coupled to the rotor disk 202 on the forward and aft sides of the dovetail slot 201 to assist in retaining the blade within the dovetail slot 201. The cover plates may be attached by various methods including, but not limited to, welding or brazing, adhesives, or mechanical fasteners to name a few.

The blade 210 experiences centrifugal forces during operation of the gas turbine engine as suggested by arrow 290 in FIG. 6. The forces 290 pull the blade 210 radially outward and forces the engagement surfaces 222, 226 to engage with the recesses 234 of the clamp blocks 232 which forces the cam surfaces 236 against the angled surfaces 205 of the dovetail slot 201. The cam surfaces 236 of the clamp blocks 232 ride along the angled surfaces 205 of the dovetail slot 201 toward one another forcing the clamp blocks 232 to grip the root 212 as suggested by arrows 292. The recesses 234 of the clamp blocks 232 may be formed such that a gap G is positioned between the clamp blocks 232 when the blade retention assembly 230 is received in the dovetail slot 201 allowing the gripping force 292 to be fully applied to the root 212.

In some embodiments, the wheel 200 may also include optional compliant members 299 as shown in FIG. 5. The compliant members 299 have greater compliance than the clamp blocks 232 and the root of the blade 210. The compliant members 299 are arranged between the clamp blocks 232 and the root 212 of the blade 210 to distribute clamp force applied to the root 212 of the blade 210 by the clamp blocks 232.

In some embodiments, the cam blocks 232 may be fixed to one another rather than free to move relative to one another to trap the root 212 of the blade 210 received by the clamp blocks 232. In some such embodiments, the clamp blocks 232 are diffusion bonded to one another. In other embodiments, the clamp blocks 232 may be diffusion brazed to one another using a braze alloy (illustratively nickel based) with adequate melting point suppressants to effectively diffuse away from a bond interface between the clamp blocks 232 and thereby create little (or no) chemical or microstructural variation between the joint and base materials. In some embodiments, the clamp blocks 232 may be fixed to one another in positions to exert clamp force on the root 212 of the blade 210 received by the clamp blocks 232 when the turbine wheel 200 is stationary.

Another illustrative turbine wheel 300 adapted for use in the gas turbine engine is shown in FIGS. 7-10. The turbine wheel 300 includes a rotor disk 302 (only a portion of which is shown), a plurality of turbine blades 310 (only one of which is shown), and a plurality of blade retention assemblies 330 (only one of which is shown) for holding the blades 310 to the rotor disk 302. In accordance with the present disclosure, the turbine blades 310 are attached to the rotor disk 302 for rotation with the rotor disk 302 about a central axis of the gas turbine engine. The blade retention assemblies 330 capture a portion of each blade 310 to engage the rotor disk 302 to couple the blades 310 to the rotor disk 302.

Figure 7:
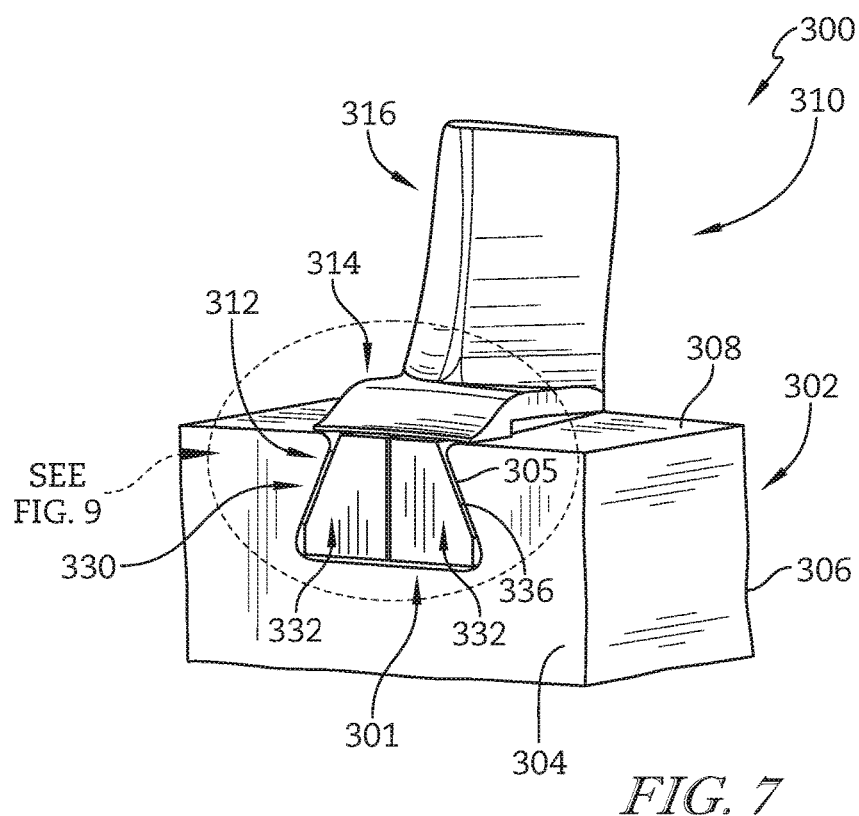
FIG. 7 is a partial perspective view of another turbine wheel adapted for use in a gas turbine engine showing that the turbine wheel includes a blade, a rotor disk having a dovetail slot, and a clamp including a pair of clamp blocks arranged within the dovetail slot to engage a root of the blade and retain the blade to the rotor disk.
Figure 8:
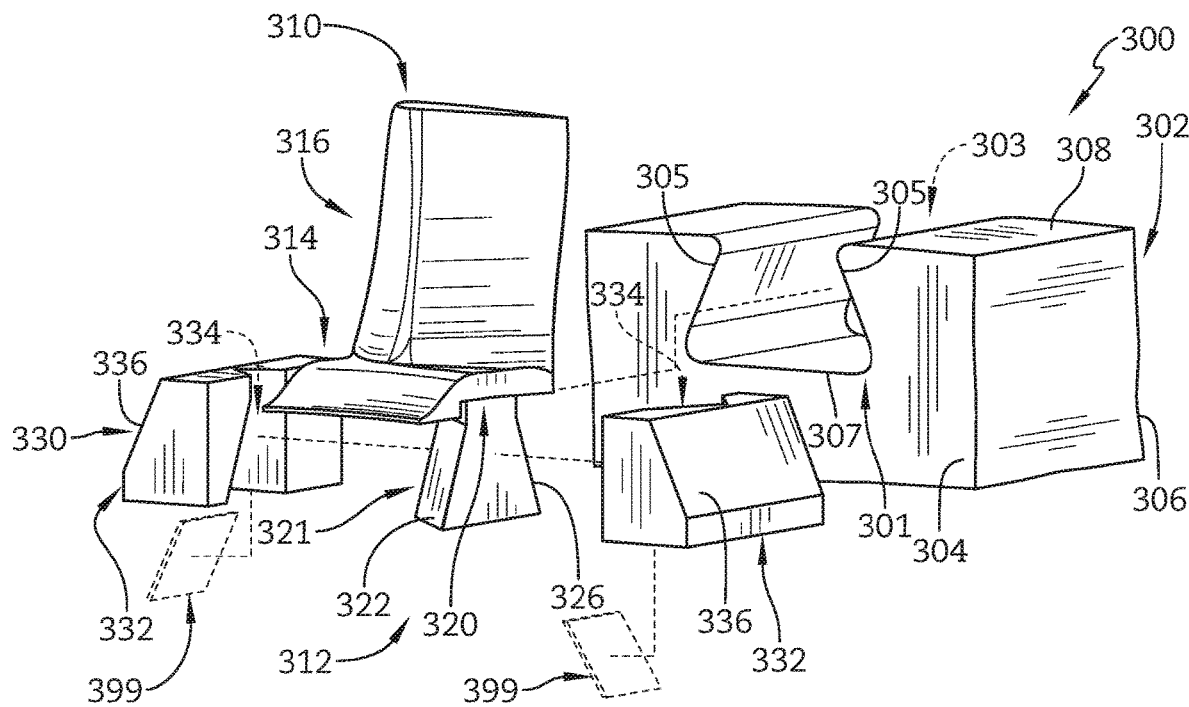
FIG. 8 is an exploded assembly view of the turbine wheel of FIG. 7 showing that the blade includes an airfoil, a platform, and the root having engagement surfaces extending outward in two directions and that the clamp blocks include recesses for receiving portions of the root to attach the blade to rotor disk and cam surfaces for engaging the dovetail slot.

The rotor disk 302 is illustratively made from a metallic superalloy (e.g. Inconel, Waspalloy, etc.) and includes a forward side 304 facing toward a front of the gas turbine engine, an aft side 306 facing toward a rear of the engine, and a radial surface 308 defining an outer diameter of the rotor disk 302 as shown in FIGS. 7 and 8. The rotor disk 302 is additionally formed to include a plurality of dovetail slots 301 (only one of which is shown) formed in the rotor disk 302. In other embodiments, the rotor disk may be made from other metallic or non-metallic materials.

Each dovetail slot 301 extends inwardly in the radial direction from the radial surface 308 of the rotor disk 302 as shown in FIG. 8. Further, each dovetail slot 301 extends through the rotor disk 302 from the forward side 304 to the aft side 306 and is shaped to form a dovetail shape when viewed from the front or aft sides 304, 306. The dovetail slots 301 are positioned to couple the plurality of blades 310 to the rotor disk 302 to form the turbine wheel 300.

The dovetail slot 301 of the rotor disk 302 illustratively includes a pair of converging angled surfaces 305 forming a radially-facing opening 303 and a rounded inner surface 307 connecting the angled surfaces 305 as shown in FIG. 8. The angled surfaces 305 extend radially outward from the rounded inner surface 307 and toward one another. The angled surfaces 305 are positioned to engage the blade retention assembly 330 to retain the root 312 of the blade 310 within the slot 301 as suggested in FIG. 7. The rounded inner surface 307 is sized and shaped to surround the blade retention assembly 330. The rounded inner surface 307 may substantially match the outer profile of the blade retention assembly 330 in order to assist in retaining the root 312 within the slot 301.

Each blade 310 of the exemplary embodiment is made from a ceramic-matrix composite material adapted to withstand high temperature combustion products discharged onto the blade 310. The blades 310 illustratively comprise silicon-carbide reinforcements suspended in silicon-carbide matrix material. In other embodiments, other reinforcements and other ceramic-containing matrix materials may be included in the blades 310.

Each blade 310 is formed to include a root 312, a platform 314 coupled to the root 312, and an airfoil 316 coupled to the platform 314 as shown, for example, in FIG. 8. The platform 314 connects the root 312 to the airfoil 316 and separates the root 312 from the airfoil 316 so that gasses passing over the airfoil 316 are blocked from moving down around the root 312 as suggested in FIG. 7. The airfoil 316 is aerodynamically shaped to interact with gasses moving over the blade 310.

In the illustrative embodiment, the root 312 includes a stem 320 and a retention head 321 as shown in FIG. 8. The stem 320 extends from the airfoil 316 and the platform 314. The retention head 321 forms engagement surfaces 322, 326 extending axially and circumferentially out from the stem 320 as shown in FIG. 8. The stem 320 is sized to be received in a radially-facing opening 303 of the dovetail slot 301 such that the root 312 can pass into the dovetail slot 301 from radially outside the slot 301 as shown in FIG. 7. The retention head 321 is sized to be received in the dovetail slot 301 and to be engaged by the retention assembly 330 when the blade 310 is coupled to the disk 302.

The blade retention assembly 330 includes a pair of clamp blocks 332 as shown in FIG. 8. Each clamp block 332 includes a recess 334 for receiving the retention head 321 included in the root 312 of the blade 310 and a cam surface 336 for engaging the angled surfaces 305 of the dovetail slot 301. The recesses 334 are formed at an angle β relative to the clamp blocks 332 to hold the root 312 of the blade 310 at an angle relative to the dovetail slot 301 as detailed further below. The angle β may be between about 0 degrees and 30 degrees relative to the dovetail slot 301. The recesses 334 substantially match the profile of the retention head 321 of the root 312 being received. For example, the recess 334 of one clamp block 332 is adapted to receive and match the profile created by the engagement surface 322 while the recess 334 of the other clamp block 332 is adapted to receive and match the profile created by the engagement surface 326.

The blade retention assembly 330 may be made from a metallic material and may comprise an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, and/or yttrium. In some embodiments the blade retention assembly 330 may comprise a ceramic or composite material in place of a metal or metal alloy.

In the illustrative embodiment, blade retention assembly 330 surrounds the root 312, and the root 312 passes with the blade retention assembly 330 into the dovetail slot 301 of the rotor disk 302 through either the forward or aft end of the dovetail slot 301 as suggested in FIG. 8. Cover plates may be coupled to the rotor disk 302 on the forward and aft sides of the dovetail slot 301 to assist in retaining the blade within the dovetail slot 301. The cover plates may be attached by various methods including, but not limited to, welding or brazing, adhesives, or mechanical fasteners to name a few.

Figure 9:
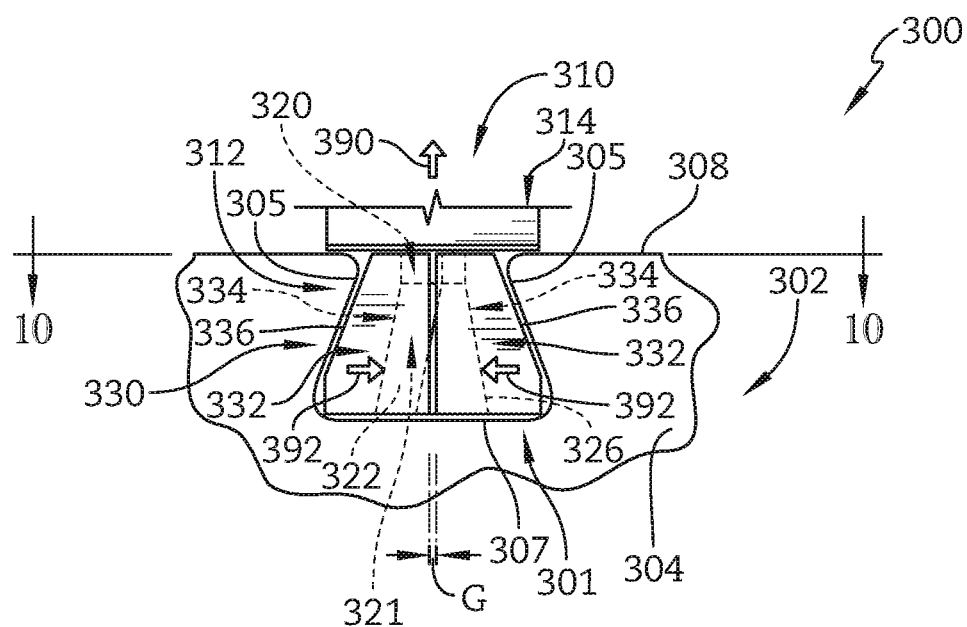
FIG. 9 is a partial front elevation view of the turbine wheel of FIG. 7 suggesting that as the blade is pulled radially outward by centrifugal forces during operation of the gas turbine engine the cam surfaces of the clamp blocks engage with converging angled surfaces of the dovetail slot to force the clamp blocks toward one another and grip the root of the blade.

The blade 310 experiences centrifugal forces during operation of the gas turbine engine as suggested by arrow 390 in FIG. 9. The forces 390 pull the blade 310 radially outward and forces the engagement surfaces 322, 326 to engage with the recesses 334 of the clamp blocks 332 which forces the cam surfaces 336 against the angled surfaces 305 of the dovetail slot 301. The cam surfaces 336 of the clamp blocks 332 ride along the angled surfaces 305 of the dovetail slot 301 toward one another forcing the clamp blocks 332 to grip the root 312 as suggested by arrows 392. The recesses 334 of the clamp blocks 332 may be formed such that a gap G is positioned between the clamp blocks 332 when the blade retention assembly 330 is received in the dovetail slot 301 allowing the gripping force 392 to be fully applied to the root 312.

Figure 10:
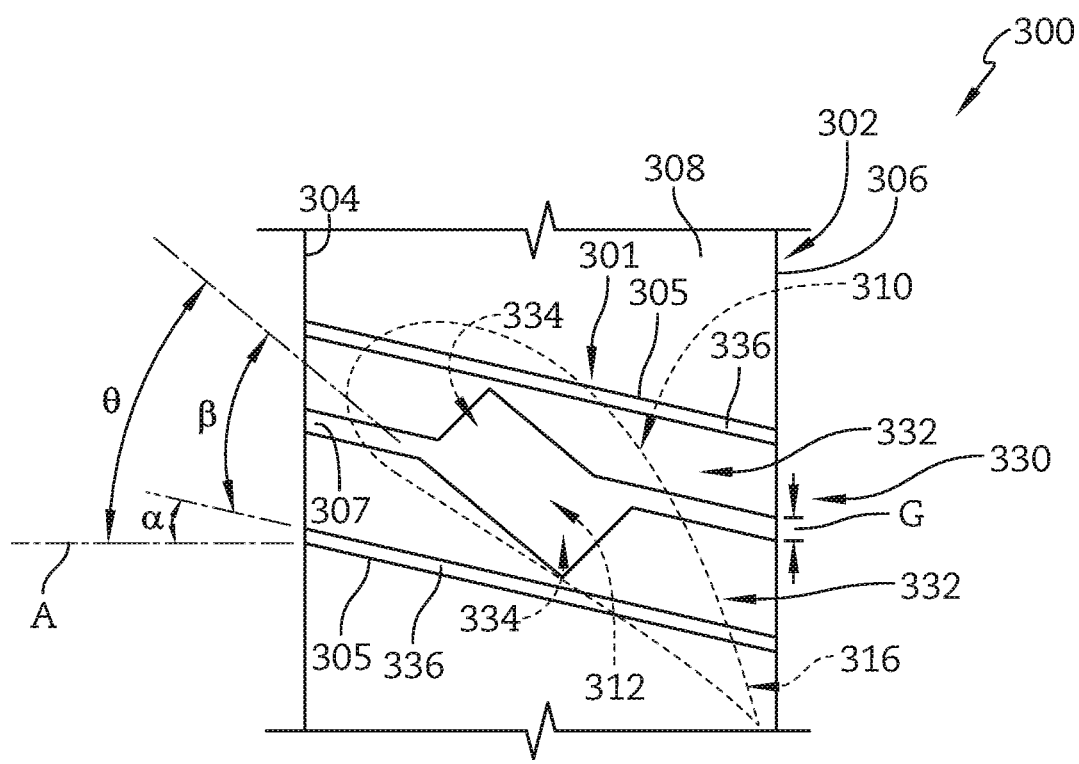
FIG. 10 is a cross-sectional view of the turbine wheel of FIG. 9 suggesting that the dovetail slot is cut into the rotor disk at a broach angle ($\alpha$) relative to an axis of rotation of the rotor disk and the recesses formed in the clamp blocks are arranged at an angle ($\beta$) relative to the dovetail slot such that the blade is positioned at a relatively greater angle ($\theta$) to the axis of rotation than the broach angle alone.

The dovetail slots 301 are formed in the rotor disk 302 at a broach angle α relative to an axis of rotation A of the rotor disk 302 as suggested in FIG. 10. The broach angle α may be between about 0 degrees and 10 degrees. The angle β of the recesses 334 formed in the clamp blocks 332 cooperate with the broach angle α of the dovetail slots 301 to position the airfoil 316 of the blade 310 at a greater relative angle θ to the axis of rotation A than the broach angle α alone.

In some embodiments, the wheel 300 may also include optional compliant members 399 as shown in FIG. 8. The compliant members 399 have greater compliance than the clamp blocks 332 and the root of the blade 310. The compliant members 399 are arranged between the clamp blocks 332 and the root 312 of the blade 310 to distribute clamp force applied to the root 312 of the blade 310 by the clamp blocks 332.

In some embodiments, the cam blocks 332 may be fixed to one another rather than free to move relative to one another to trap the root 312 of the blade 310 received by the clamp blocks 332. In some such embodiments, the clamp blocks 332 are diffusion bonded to one another. In other embodiments, the clamp blocks 332 may be diffusion brazed to one another using a braze alloy (illustratively nickel based) with adequate melting point suppressants to effectively diffuse away from a bond interface between the clamp blocks 332 and thereby create little (or no) chemical or microstructural variation between the joint and base materials. In some embodiments, the clamp blocks 332 may be fixed to one another in positions to exert clamp force on the root 312 of the blade 310 received by the clamp blocks 332 when the turbine wheel 300 is stationary.

Figure 11:
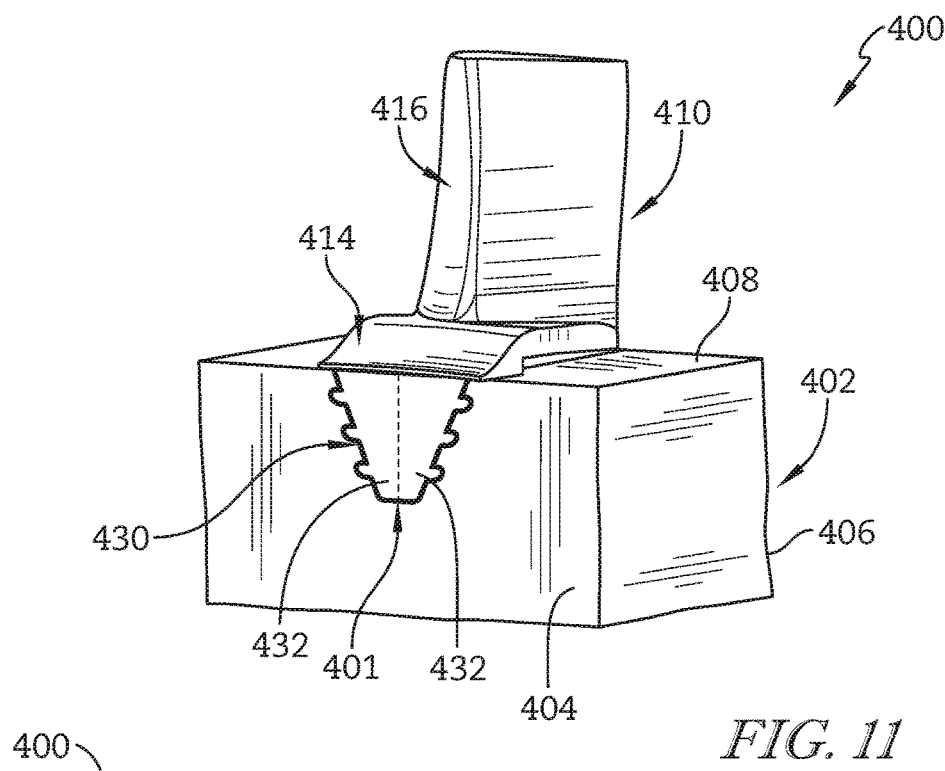
FIG. 11 is a partial perspective view of another turbine wheel adapted for use in a gas turbine engine showing that the turbine wheel includes a blade, a rotor disk having a fir tree slot, and a clamp including a pair of clamp blocks arranged within the fir tree slot to engage a root of the blade and retain the blade to the rotor disk.
Figure 12:
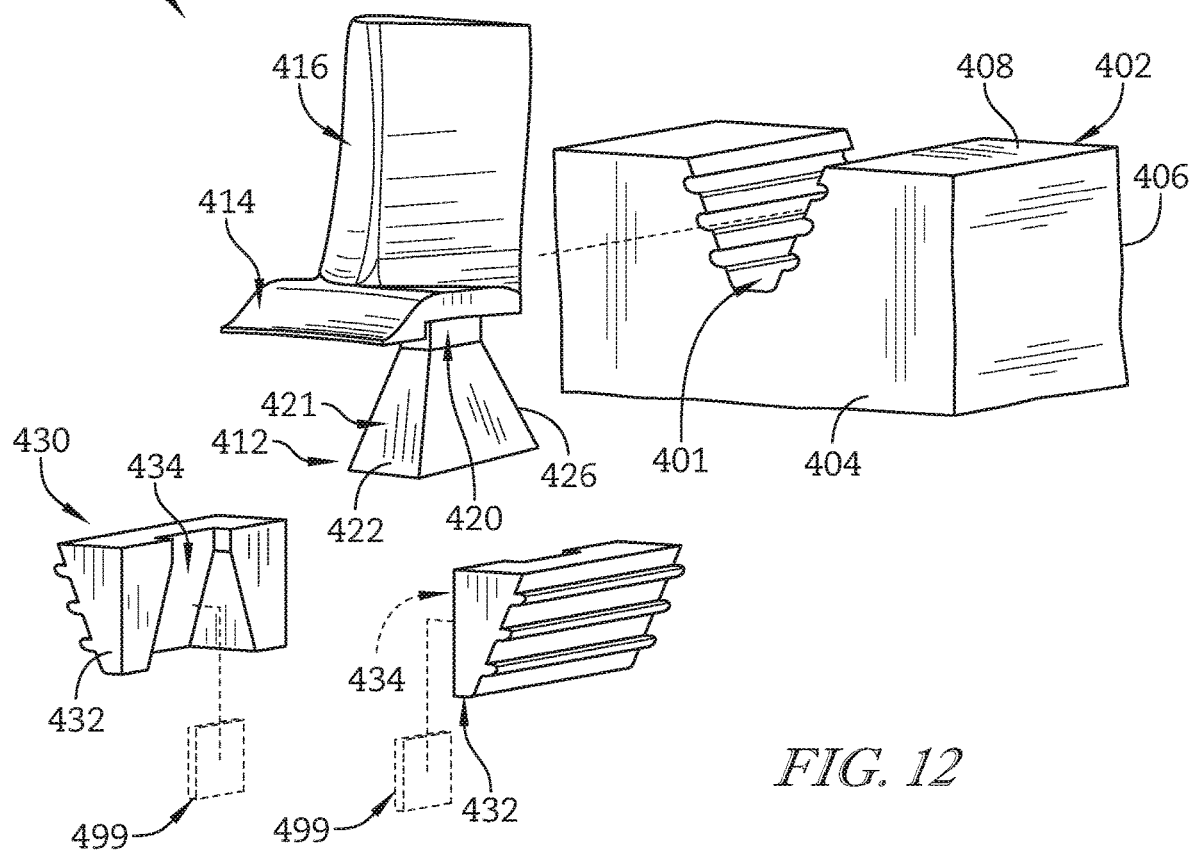
FIG. 12 is an exploded assembly view of the turbine wheel of FIG. 11 showing that the blade includes an airfoil, a platform, and the root having engagement surfaces extending outward in an axial direction and that the clamp blocks include recesses for receiving portions of the root to attach the blade to rotor disk and cam surfaces for engaging the dovetail slot.

Another illustrative turbine wheel 400 adapted for use in the gas turbine engine is shown in FIGS. 11-12. The turbine wheel 400 includes a rotor disk 402 (only a portion of which is shown), a plurality of turbine blades 410 (only one of which is shown), and a plurality of blade retention assemblies 430 (only one of which is shown) for holding the blades 410 to the rotor disk 402. In accordance with the present disclosure, the turbine blades 410 are attached to the rotor disk 402 for rotation with the rotor disk 402 about a central axis of the gas turbine engine. The blade retention assemblies 430 capture a portion of each blade 410 to engage the rotor disk 402 to couple the blades 410 to the rotor disk 402.

The rotor disk 402 is illustratively made from a metallic superalloy (e.g. Inconel, Waspalloy, etc.) and includes a forward side 404 facing toward a front of the gas turbine engine, an aft side 406 facing toward a rear of the engine, and a radial surface 408 defining an outer diameter of the rotor disk 402 as shown in FIGS. 7 and 8. The rotor disk 402 is additionally formed to include a plurality of fir tree slots 401 (only one of which is shown) formed in the rotor disk 402. In other embodiments, the rotor disk may be made from other metallic or non-metallic materials.

Each fir tree slot 401 extends inwardly in the radial direction from the radial surface 408 of the rotor disk 402 as shown in FIG. 11. Further, each fir tree slot 401 extends through the rotor disk 402 from the forward side 404 to the aft side 406 and is shaped to form a fir tree shape when viewed from the front or aft sides 404, 406. The fir tree slots 401 are positioned to couple the plurality of blades 410 to the rotor disk 402 to form the turbine wheel 400.

Each blade 410 of the exemplary embodiment is made from a ceramic-matrix composite material adapted to withstand high temperature combustion products discharged onto the blade 410. The blades 410 illustratively comprise silicon-carbide reinforcements suspended in silicon-carbide matrix material. In other embodiments, other reinforcements and other ceramic-containing matrix materials may be included in the blades 410.

Each blade 410 is formed to include a root 412, a platform 414 coupled to the root 412, and an airfoil 416 coupled to the platform 414 as shown, for example, in FIG. 11. The platform 414 connects the root 412 to the airfoil 416 and separates the root 412 from the airfoil 416 so that gasses passing over the airfoil 416 are blocked from moving down around the root 412 as suggested in FIG. 7. The airfoil 416 is aerodynamically shaped to interact with gasses moving over the blade 410.

In the illustrative embodiment, the root 412 includes a stem 420 and a retention head 421 as shown in FIG. 11. The stem 420 extends from the airfoil 416 and the platform 414. The retention head 421 forms engagement surfaces 422, 426 extending axially and circumferentially out from the stem 420 as shown in FIG. 11. The stem 420 is sized to be received in a radially-facing opening 403 of the fir tree slot 401 such that the root 412 can pass into the fir tree slot 401 from radially outside the slot 401 as shown in FIG. 7. The retention head 421 is sized to be received in the fir tree slot 401 and to be engaged by the retention assembly 430 when the blade 410 is coupled to the disk 402.

The blade retention assembly 430 includes a pair of clamp blocks 432 as shown in FIG. 11. Each clamp block 432 includes a recess 434 for receiving the retention head 421 included in the root 412 of the blade 410 and a cam surface 436 for engaging the angled surfaces 405 of the fir tree slot 401. The recesses 434 substantially match the profile of the retention head 421 of the root 412 being received. For example, the recess 434 of one clamp block 432 is adapted to receive and match the profile created by the engagement surface 421 while the recess 434 of the other clamp block 432 is adapted to receive and match the profile created by the engagement surface 426.

In some embodiments, the platform 414 and may be incorporated into the clamp blocks 432 of the blade retention assembly 430 with portions of the platform 414 extending from each clamp block 432 as is suggested in FIGS. 4-6. In such embodiments, the platform 414 may be omitted from the blade 410.

The blade retention assembly 430 may be made from a metallic material and may comprise an alloy which may be cobalt-, nickel- or iron-based and may be alloyed with manganese, chromium, silicon, cobalt, tungsten, tantalum, aluminum, titanium, hafnium, rhenium, molybdenum, nickel, iron, boron, vanadium, carbon, and/or yttrium. In some embodiments the blade retention assembly 430 may comprise a ceramic or composite material in place of a metal or metal alloy.

In the illustrative embodiment, blade retention assembly 430 surrounds the root 412, and the root 412 passes with the blade retention assembly 430 into the fir tree slot 401 of the rotor disk 302 through either the forward or aft end of the fir tree slot 401 as suggested in FIG. 11. Cover plates may be coupled to the rotor disk 402 on the forward and aft sides of the fir tree slot 401 to assist in retaining the blade within the fir tree slot 401. The cover plates may be attached by various methods including, but not limited to, welding or brazing, adhesives, or mechanical fasteners to name a few.

In some embodiments, the wheel 400 may also include optional compliant members 499 as shown in FIG. 11. The compliant members 499 have greater compliance than the clamp blocks 432 and the root of the blade 410. The compliant members 499 are arranged between the clamp blocks 432 and the root 412 of the blade 410 to distribute clamp force applied to the root 412 of the blade 410 by the clamp blocks 432.

The cam blocks 432 are fixed to one another and trap the root 412 of the blade 410 received by the clamp blocks 432. In some such embodiments, the clamp blocks 432 are diffusion bonded to one another. In other embodiments, the clamp blocks 432 may be diffusion brazed to one another using a braze alloy (illustratively nickel based) with adequate melting point suppressants to effectively diffuse away from a bond interface between the clamp blocks 432 and thereby create little (or no) chemical or microstructural variation between the joint and base materials. The clamp blocks 432 are illustratively fixed to one another in positions to exert clamp force on the root 412 of the blade 410 received by the clamp blocks 432 when the turbine wheel 400 is stationary.

A method of making the wheel 400 may include clamping the retention head 421 included in the root 412 of the ceramic-containing blade 410 between the clamp blocks 432 included in the blade retention assembly 430. The method may also include fixing the clamp blocks 432 to one another to exert clamp force on the retention head 421 of the blade 410. Fixing the clamp blocks 432 to one another may include diffusion bonding them to one another or diffusion brazing them to one another.

The method may include machining the blade retention assembly 430 into a fir tree shape corresponding to the fir tree slot 401 formed in the disk 402. The method may include inserting the retention head 421 and blade retention assembly 430 into the dovetail slot 401 to couple the ceramic-containing blade to the disk.

The method may include positioning at least one compliant member 499 having greater compliance than the clamp blocks 432 and the blade 410 between at least one of the two clamp blocks 432 and the retention head 421 of the blade 410 to distribute clamp force applied to the retention head 421 of the blade 410 by the clamp blocks 432.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine wheel for a gas turbine engine, the turbine wheel comprising
    a rotor disk formed to include a slot cut into the rotor disk at a broach angle ($\alpha$) relative to a central axis of the rotor disk that extends through the rotor disk from a forward side to an aft side of the rotor disk and inwardly in a radial direction from an outer diameter of the rotor disk toward the central axis,
    a blade comprising ceramic-containing materials, the blade formed to include an airfoil that extends outwardly in the radial direction from the outer diameter of the rotor disk and a root that extends into the slot, the root including a stem that extends from the airfoil into the slot and a retention head that extends from the stem and is arranged in the slot, and
    a blade retention assembly including at least two clamp blocks, wherein the at least two clamp blocks are formed to include recesses that receive the retention head of the blade, wherein the clamp blocks engage the retention head and are configured to transfer centrifugal loads from the retention head through the blade retention assembly to the rotor disk when the turbine wheel is rotated about the central axis, and wherein the recesses formed in the clamp blocks are arranged at an angle ($\beta$) relative to the slot such that the blade is positioned at a relatively greater angle ($\theta$) to the central axis than the broach angle alone.

2. The turbine wheel of claim 1, wherein the retention head extends axially out from the stem.

3. The turbine wheel of claim 2, wherein the retention head extends circumferentially out from the stem.

4. The turbine wheel of claim 1, wherein the at least two clamp blocks are moveable independent of one another within the slot.

5. The turbine wheel of claim 1, wherein the at least two clamp blocks are fixed to one another to trap the root of the blade engaged by the at least two clamp blocks.

6. The turbine wheel of claim 5, wherein the at least two clamp blocks are diffusion bonded to one another.

7. The turbine wheel of claim 5, wherein the at least two clamp blocks are diffusion brazed to one another.

8. The turbine wheel of claim 5, wherein the at least two clamp blocks are fixed to one another in positions to exert clamp force on the root of the blade engaged by the at least two clamp blocks when the turbine wheel is stationary.

9. The turbine wheel of claim 8, further comprising at least one compliant member having greater compliance than the at least two clamp blocks and the root of the blade, wherein the at least one compliant member is arranged between at least one of the two clamp blocks and the root of the blade to distribute clamp force applied to the root of the blade by the clamp blocks.

10. The turbine wheel of claim 1, wherein the slot has a dovetail cross-sectional shape and the clamp blocks cooperate to form a corresponding dovetail shape.

11. The turbine wheel of claim 1, wherein the slot has a fir tree cross-sectional shape and the clamp blocks cooperate to form a corresponding fir tree shape.

12. The turbine wheel of claim 1, wherein the retention head extends in an axially forward and aft direction out from the stem.

13. The turbine wheel of claim 12, wherein the retention head extends circumferentially out from the stem.

14. A turbine wheel for a gas turbine engine, the turbine wheel comprising
    a rotor disk formed to include a slot cut into the rotor disk at a broach angle ($\alpha$) relative to a central axis of the rotor disk that extends through the rotor disk from a forward side to an aft side of the rotor disk,
    a blade formed to include an airfoil and a root that extends into the slot, the root including a stem that extends from the airfoil into the slot and a retention head arranged in the slot, and
    a blade retention assembly including two clamp blocks, wherein the two clamp blocks are formed to include recesses that receive the retention head of the blade, wherein the clamp blocks engage the retention head, and wherein the recesses formed in the clamp blocks are arranged at an angle ($\beta$) relative to the slot such that the blade is positioned at a relatively greater angle ($\theta$) to the central axis than the broach angle ($\alpha$) alone.

15. The turbine wheel of claim 1, wherein the retention head extends in an axially forward and aft direction out from the stem.

16. The turbine wheel of claim 15, wherein the retention head extends circumferentially out from the stem.

17. The turbine wheel of claim 15, wherein the two clamp blocks are fixed to one another to trap the root of the blade engaged by the two clamp blocks.

18. The turbine wheel of claim 17, wherein the two clamp blocks are fixed to one another in positions to exert clamp force on the root of the blade engaged by the two clamp blocks when the turbine wheel is stationary.

* * * * *